Dec. 25, 1945.   C. R. CRAIG   2,391,681
GANG-OPERATING MECHANISM FOR SWITCHING DEVICES
Filed Jan. 23, 1943
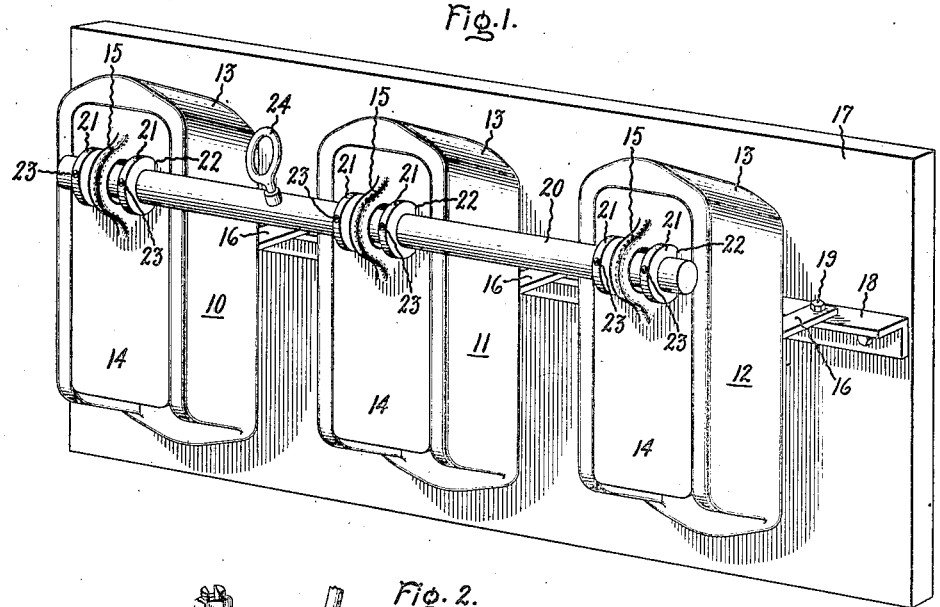
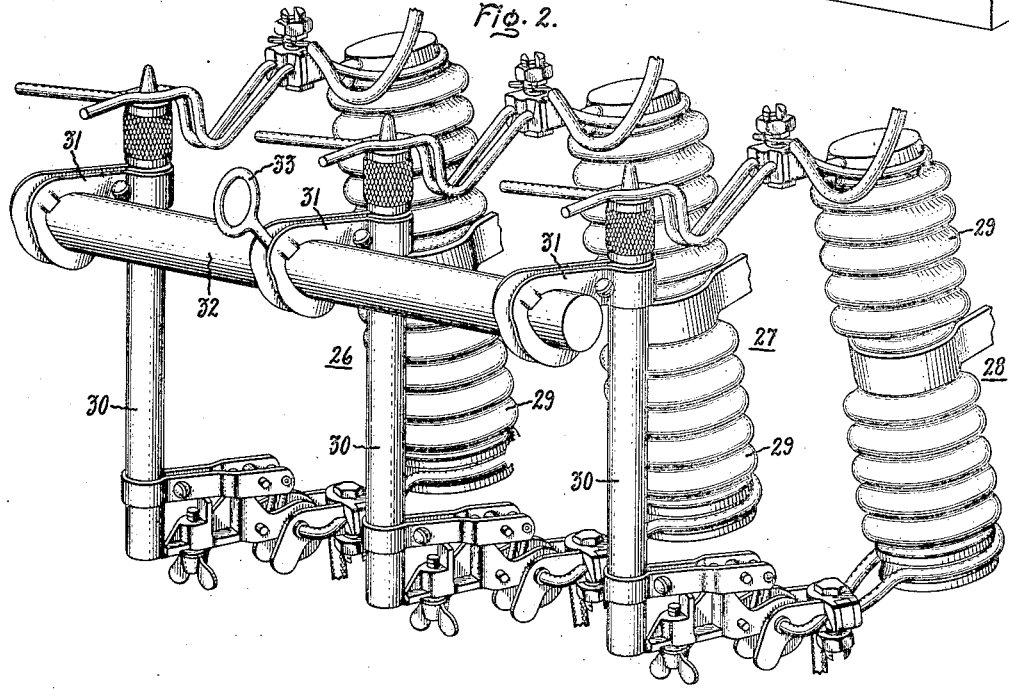
Inventor:
Charles R. Craig,
by Harry E. Dunham
His Attorney.

Patented Dec. 25, 1945

2,391,681

UNITED STATES PATENT OFFICE 2,391,681

GANG-OPERATING MECHANISM FOR SWITCHING DEVICES

Charles R. Craig, Pittsfield, Mass., assignor to General Electric Company, a corporation of New York Application January 23, 1943, Serial No. 473,340

2 Claims. (Cl. 200—153)

My invention relates to switching devices, and more particularly to a gang-operating mechanism for a plurality of standard switching devices well known in the art.

Switching devices such as fuse cutouts of either the open or enclosed type are used extensively for protecting electrical apparatus of all sorts. Sometimes such fuse cutout types of switching devices are used to protect polyphase equipment such as a three-phase capacitor bank or the like. In addition to protecting the apparatus such fuse cutouts may also act as switching devices for disconnecting the equipment from the line. Occasionally it is desirable that a plurality of such switching devices be operated simultaneously to disconnect a polyphase equipment or apparatus from the line and to this end some sort of gang-operating mechanism is required. My invention is particularly concerned with a simple and inexpensive gang-operating mechanism for switching devices of the standard fuse cutout type wherein the fuse cutouts may be mounted in a more or less hit or miss fashion at any desired spacing and yet the gang-operating mechanism of my invention will permit proper gang operation thereof.

Accordingly, it is an object of my invention to provide a new and improved gang-operating mechanism for switching devices such as standard fuse cutouts well known to the art.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing, in which Fig. 1 is a perspective view of a gang-operating mechanism embodying my invention, and Fig. 2 is a perspective view similar to Fig. 1 of a modification of my invention.

Referring now to Fig. 1 of the drawing I have illustrated a plurality of fuse cutout devices well known in the art and designated generally as 10, 11 and 12, respectively. These fuse cutouts are preferably of the well known prior art construction such, for example, as the cutout disclosed and claimed in U. S. Letters Patent No. 2,081,813, Hermann, granted May 25, 1937, and assigned to the same assignee as the present application. Such well known switching devices generally comprise a housing or a casing of porcelain indicated at 13 in Fig. 1 within which are mounted stationary contacts and line terminals. An open side of this housing is closed by means of a door or cover, designated as 14 in Fig. 1, which door is pivotally mounted at the lower end thereof so that it may be pulled open as by means of an operating eye 15. Since the switching devices 10, 11 and 12 of Fig. 1 are all identical, the corresponding parts thereof are designated by the same reference numerals. It will be understood that a suitable circuit interrupting device and switching device will be mounted on the doors 14 of fuse cutouts 10, 11 and 12 as is clearly shown in the above-mentioned Hermann patent and, consequently, no further discussion of these switching devices will be included hereinafter.

For protecting a polyphase circuit these switching devices may be mounted in spaced relationship with respect to one another without any limitations as to the space between the respective switching devices except the question of electrical insulation. Each of these switching devices is provided with a bar 16 cemented or otherwise suitably fastened to the rear of the housing or casing 13 for supporting the switching device from any suitable supporting structure. For example, the bar 16 may be connected to suitable U-shaped clamps as indicated in the above-mentioned Hermann patent so as to be readily supported from the cross-arm of a pole. In Fig. 1 I have illustrated the switching devices 10, 11 and 12 as supported from a panel 17 to which is bolted an angle iron 18. Switching devices 10, 11 and 12 are supported from the angle iron 18 by means of bars 16 which are bolted thereto as indicated at 19. With this arrangement switching devices may be mounted in spaced relationship to one another so that the operating eyes 15 of all of the covers 14 are in substantial alignment with each other.

In order to obtain simultaneous operation of all of the switching devices 10, 11 and 12 to disconnect the polyphase equipment from the line, for example, I provide an insulating rod 20 which is adapted to extend through all the operating eyes 15 associated with the respective covers 14 of the fuse cutouts of Fig. 1, thereby providing a suitable gang-operating mechanism. Rotation of insulating rod 20 relative to operating eyes 15 is prevented by means of suitable insulating spacers 21 which are provided with a flattened surface 22 for engaging the cover or door 14 of the switching devices 10, 11 and 12. These insulating spacers or washers are placed on insulating rod 20, one on either side of the operating eyes 15 of each of the doors or covers 14. Furthermore, these insulating spacers or washers are held in this position by suitable screws 23 as indicated in Fig. 1. In order to obtain simultaneous operation of the plurality of switching devices by means of a suitable switch stick or the like, I provide an eye bolt 24 which is fastened to the insulating rod 20 as indicated in Fig. 1.

From the arrangement described above it will be observed that I have provided a relatively simple and inexpensive gang-operating mechanism for a plurality of switching devices such as the well known fuse cutouts of the prior art. In view of the detailed description included above, the operation of the gang-operating mechanism will be obvious, and no further discussion will be included herein.

Since my invention is equally applicable to fuse cutouts of the open type as contrasted with fuse cutouts of the closed type shown in Fig. 1, I have illustrated in Fig. 2 my invention as applied to the open type fuse cutout such as is disclosed in U. S. Letters Patent Nos. 1,973,265, Olsen et al.; 2,025,563, Bennett; and 2,119,388, Hermann, all assigned to the same assignee as the present application. All of these switching devices which are generally designated as 26, 27 and 28 in Fig. 2 are identical with the disclosures of the above-mentioned patents, each including an insulating supporting member 29. Mounted on insulating supporting members 29 are switches 30 which as illustrated include a fuse tube within which is mounted a fusible element. For the manual operation of each of the switching devices 26, 27 and 28 there is provided an operating eye 31 secured to the switch 30 in a manner identical with that disclosed in the above-mentioned patents, particularly Hermann No. 2,119,388. As in Fig. 1 the switching devices may be mounted in any suitable manner and may be spaced from each other in any manner so long as the operating eyes 31 are in substantial alignment with each other. As in connection with Fig. 1 I provide a suitable insulating rod 32 which passes through the operating eye of all of the switching devices 26, 27 and 28. This insulating rod 32 is fastened to each of the operating eyes in any suitable manner, as by suitable screws or the like. For example, the screws may pass through a member such as the strap 47 of Hermann Patent No. 2,119,388, not shown in Fig. 2, into insulating rod 32. A suitable eye bolt 33 completes the gang-operating mechanism by which simultaneous operation of the switching devices 26, 27 and 28 is obtained.

From the above description it will be obvious that I have provided a new and improved simple and inexpensive gang-operating mechanism for switching devices such as the well known fuse cutouts of the prior art, whether they be of the open or closed type. This gang-operating mechanism permits the switching devices to be mounted in any desired location and to be spaced in a more or less hit or miss fashion so long as the operating eyes are in substantial alignment with one another.

While I have described particular embodiments of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a plurality of switching devices, each including an operating eye, means for mounting said switching devices in spaced relationship with respect to one another so that said operating eyes are in substantial alignment with each other, an insulating rod extending through the operating eye of all of said switching devices, insulating spacers mounted on said rod on either side of said operating eyes to hold said insulating rod against movement relative to said operating eyes, and means including said insulating rod for providing a gang-operating mechanism for said switching devices.

2. In combination, a plurality of switching devices, each comprising a housing and a cover for closing an open side of said housing, an operating eye on each of said covers, means for mounting said housings in spaced relationship with respect to one another so that said operating eyes are in substantial alignment with each other, an insulating rod extending through the operating eye of all of said covers, insulating spacers mounted on said rod on either side of each of said operating eyes to hold said insulating rod against movement relative to said covers, and means including said insulating rod for providing a gang-operating mechanism for said switching devices.

CHARLES R. CRAIG.